Nov. 2, 1971  A. J. GRINER  3,616,765
APPARATUS FOR FORMING FOOD PRODUCTS OR THE LIKE
Filed July 16, 1969  3 Sheets-Sheet 3
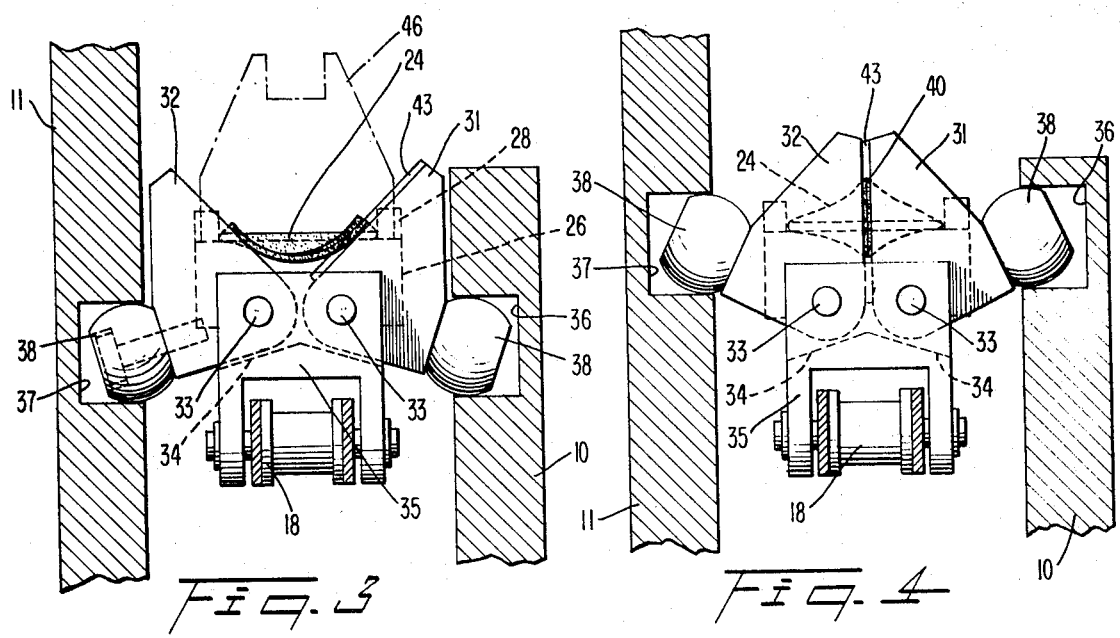
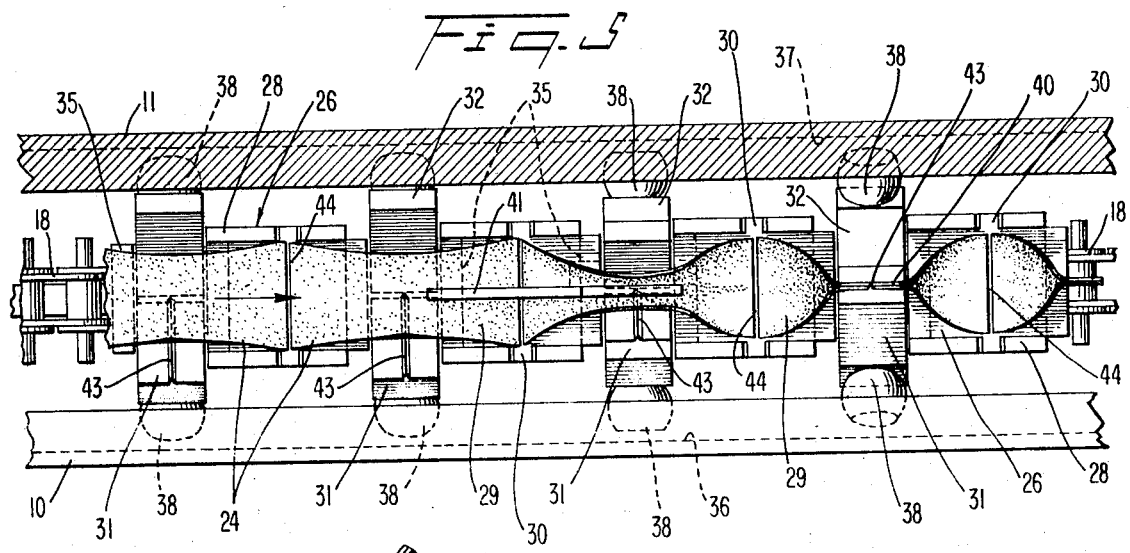
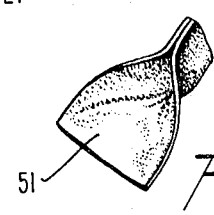
INVENTOR.
ARTHUR J. GRINER
BY
Bauer and Seymour
ATTORNEYS 3,616,765
Patented Nov. 2, 1971

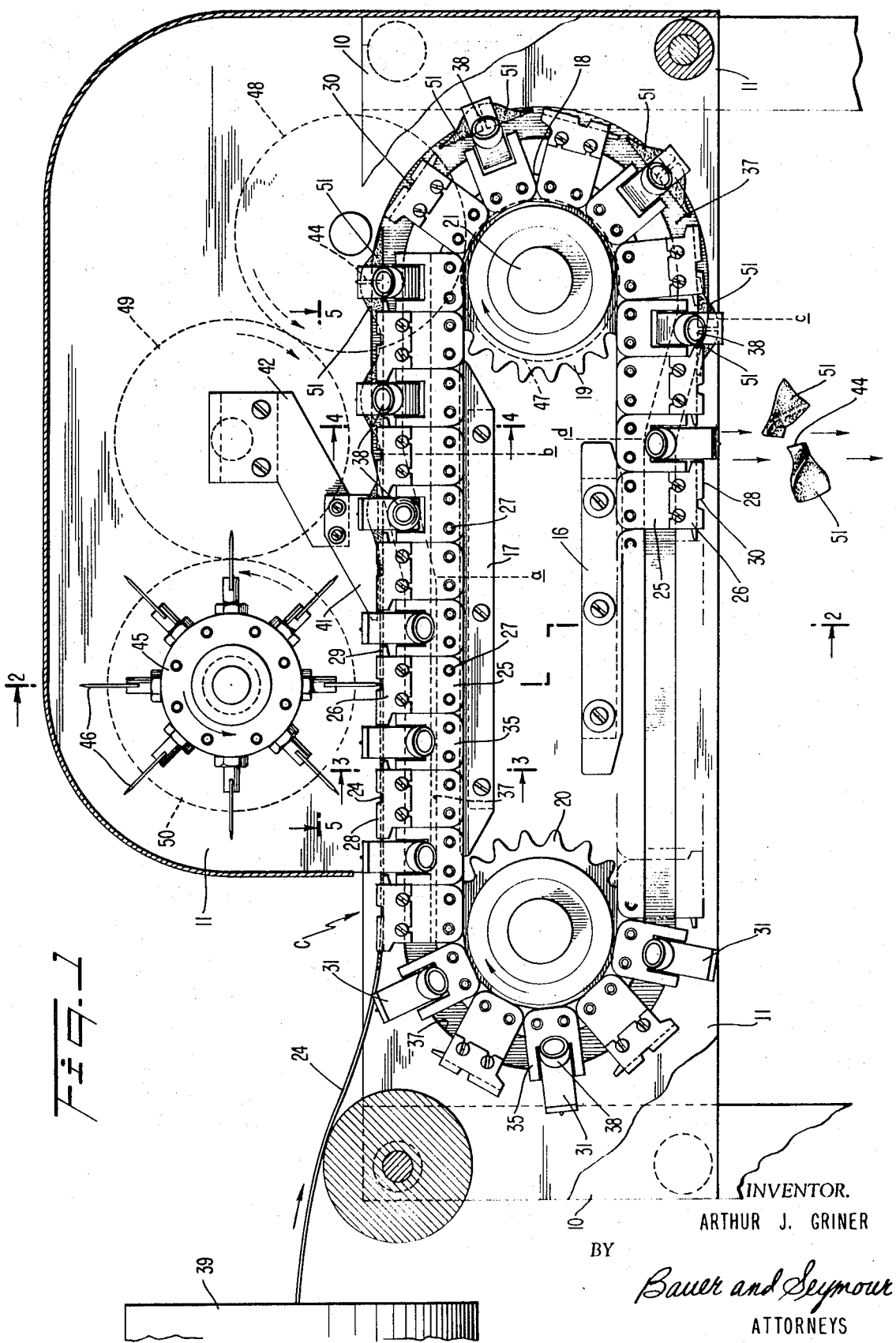

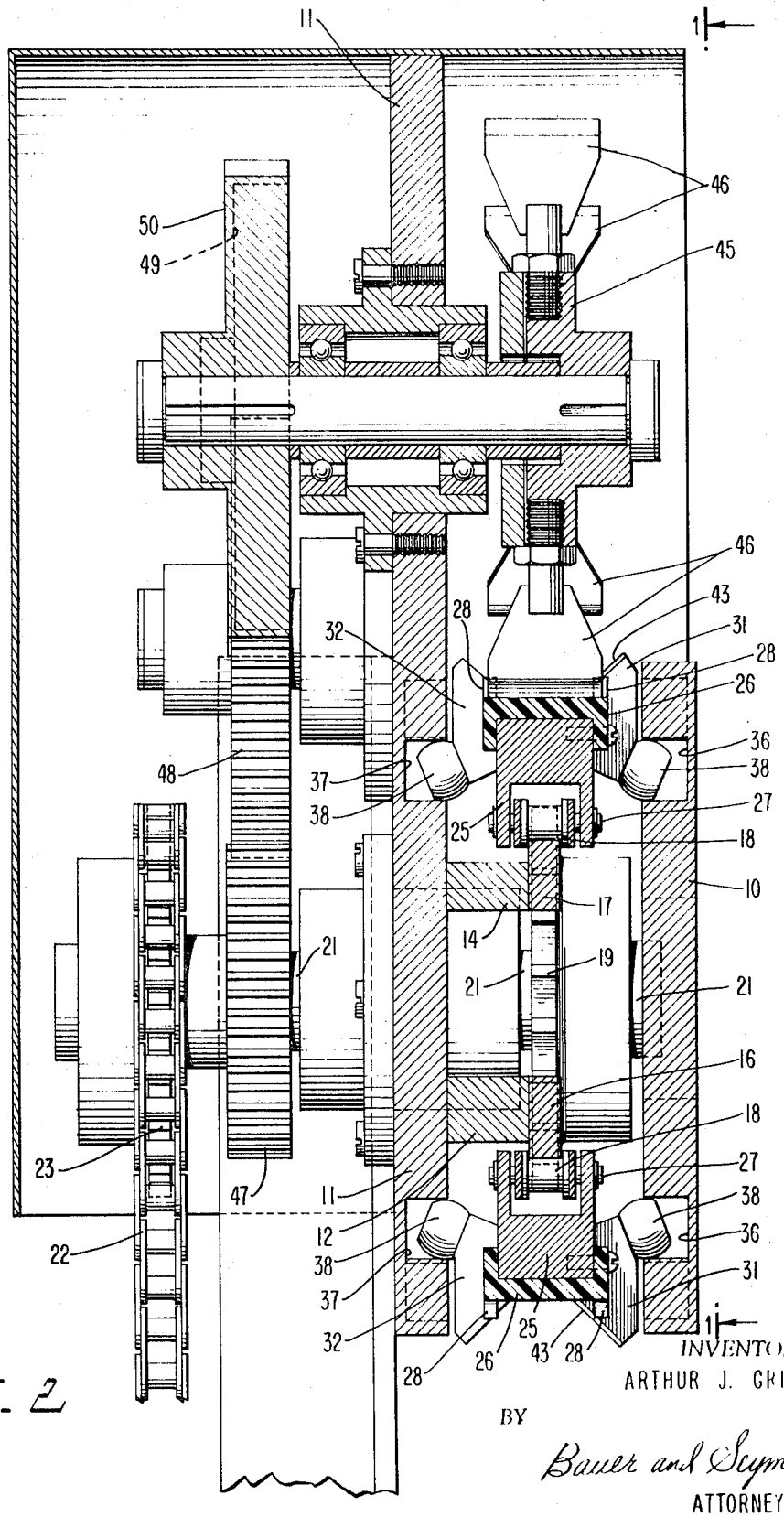

3,616,765
APPARATUS FOR FORMING FOOD PRODUCTS OR THE LIKE
Arthur J. Griner, Wyckoff, N.J., assignor to National Biscuit Company
Filed July 16, 1969, Ser. No. 842,170
Int. Cl. A21c 11/10
U.S. Cl. 107—69                                                                 11 Claims

ABSTRACT OF THE DISCLOSURE

Apparatus which continuously conveys a flexible, ribbon-like strip of edible material, such as gelatinized dough, including sections severed from the leading end thereof, bends the advancing ribbon or sections along or near the longitudinal center line thereof to form folds centrally of such sections and presses the sides of the folds together, transversely severs the strip between successive folds and at the center of each fold to thereby form scoop-like articles each having a finger grip portion at one end and a transversely bowed portion at the other end.

---

This invention relates to apparatus for making food prodcts and more particularly to a machine for automatically shaping and dividing strip material into scoop-shaped products.

One of the objects of the present invention is to provide novel apparatus for conveying a continuous strip of edible material in novel combination with means for shaping and cutting the strip while it advances.

Another object of the invention is to provide a novelly constructed machine which is capable of automatically producing food products economically at high speed.

A further object is to provide apparatus embodying novel means for forming longitudinally spaced folds in a moving strip of edible material.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a front elevation view, with parts broken away and some parts shown in phantom, of one form of apparatus embodying the invention, the view being taken in the plane of line 1—1 of FIG. 2;

FIG. 2 is a vertical sectional view, taken substantially on line 2—2 of FIG. 1;

FIG. 3 is an enlarged scale detail sectional view of one of the strip folding means in open position, the view being taken on line 3—3 of FIG. 1;

FIG. 4 is a view similar to FIG. 3 taken on line 4—4 of FIG. 1 and illustrating the folding means in closed position;

FIG. 5 is a detail top plan view of the conveyor and strip folding means taken on line 5—5 of FIG. 1; and FIG. 6 is an isometric view of a product produced by the illustrated apparatus.

The single embodiment of the invention illustrated in the drawings, by way of example, is in the form of a machine for automatically producing scoop-shaped articles from a continuously moving strip. As shown, the apparatus comprises a rigid frame including spaced parallel plates 10 and 11. The rear plate 11 supports bracket means 12 and 14 (FIG. 2) on which are mounted guide rails 16 and 17. The latter serve as guides for the upper and lower reaches of an endless conveyor chain 18 supported on a driven sprocket 19 and an idler sprocket 20. The shafts of the latter are suitably rotatably journalled in frame 10, 11 and the shaft 21 for the driven sprocket extends rearwardly from plate 11 (to the left in FIG. 2) to be driven from a suitable power source (not shown) by a chain 22 and sprocket 23.

The novel conveyor means C contemplated by the invention comprises endless chain 18, a series of spaced block-like members which perform the dual functions of supporting the strip 24 and serving as cutting blocks therefor, and a series of pairs of folding or crimping jaws which alternate with said block-like members along the length of the chain. Each of the dual function block-like members may be of either unitary or fabricated construction, and in the form shown comprises an inner channel-shaped or base piece 25 and an outer piece or crown 26 made of Teflon or comparable material. Base piece 25 straddles chain 18 and is supported on the transverse pins 27 which connect the links of the chain. Crown pieces 26 are secured to base pieces 25 by set screws or other suitable means and have side flanges 28 to laterally confine a ribbon-like strip 24 of material to be processed, including severed sections 29 at the leading end thereof. Flanges 28 preferably have transverse grooves 30 to facilitate the cutting strip 24 by means to be hereinafter described.

Means for folding or crimping the strip material 24, 29 at spaced intervals are novelly constituted and actuated in response to movement of the conveyor chain. In the specific illustrated embodiment, said means are mounted on and form part of the conveyor means C and include a plurality of pairs of clamping or pinching jaws 31, 32 interposed between successive cutting blocks 25, 26. Said jaws are made of or coated with Teflon or a similar material and are pivotally mounted on pins 33 extending across transverse slots 34 in the outer portions of blocks 35. The inner portions of said blocks are channel-shaped like blocks 25 and are secured to chain 18 in the same manner, i.e., by means of two adjacent pins 27. The desired pivotal movement for opening and closing jaws 31, 32 is imparted thereto by identical or twin cam tracks 36 and 37 formed in frame plates 10 and 11, respectively, which tracks cooperate with rollers 38 journalled on stub shafts extending from the outer lower edges of jaws 31, 32. As seen in FIG. 1, with the conveyor travelling clockwise, the jaws 31, 32 are open (FIG. 3) as they enter the upper horizontal reach of the conveyor to receive the strip 24 from an extruder 39 or other suitable source. As each pair of jaws moves from *a* to *b* the rollers thereon follow inclined portions of the cam tracks to pivot the jaws to closed position (FIG. 4). The jaws remain closed, travelling from *b* to *c*, and are reversely pivoted to open position (FIG. 3) by the reverse contour of the cam tracks from position *c* to position *d*. Travelling from position *d* to position *a* the jaws remain open.

When jaws 31, 32 are open the upper surfaces thereof preferably converge downwardly and inwardly at a suitable angle, such as about 90°, which is not critical and may vary widely. Thus, the flexible dough strip 24 will rest partially on the upper surfaces of crown pieces 26 and partially on jaws 31, 32. The portion of strip 24 supported by the jaws may assume an upwardly concave contour in transverse cross section (FIG. 3), the extent of which will depend upon the consistency and flexibility of the strip. As a pair of jaws are closed in response to cam tracks 36, 37 and the advance of the conveyor and the rollers 38 from position *a* to position *b*, the portion of strip 24 between such jaws is progressively folded upwardly along the longitudinal center line of the strip to form a fold 40 while the strip is in motion. During most of the folding operation that portion of the strip in the vicinity of the fold is preferably prevented by a stop plate 41 (FIGS. 1 and 5) from being lifted upwardly off the supporting blocks 25, 26. Stop or hold-down plate 41 may be supported by rear frame plate 11 on a suitable bracket means 42. When in closed position the adjacent faces of jaws 31, 32 are parallel and separated sufficiently to accommodate the fold 40 under slight compression to effect adherence of the engaging sides of the fold.

Means are provided for severing the strip 24 centrally of the folds 40 and on a transverse line across each cutting block 25, 26 between successive folds without interrupting the advancing movement of the strip. In the form shown, said means for cutting the strip at the folds consists of a cutting blade or sharp edged ridge 43 on at least one jaw of each pair, such as on jaw 32. Thus, one jaw may carry a cutting means while the other serves as a cutting block. The cutting means which cooperates with blocks 25, 26 to sever the strip between successive folds 40, as at 44, is shown in the form of a rotary drum or wheel 45 with a plurality of radially adjustable angularly spaced cutting blades 46. These blades are timed to cooperate with each block 25, 26 as it passes the vertical plane containing the axis of drum 45. The latter is driven from shaft 21 by a gear train 47, 48, 49, 50 in timed relation with the conveyor C. The rotary cutting means in the illustrated embodiment is positioned to sever a leading section 29 of strip 24 before the same is folded by jaws 31, 32, but it will be obvious that the cutting means may be so positioned as to sever the sections from the strip either before, after or during formation of the fold 40 therein.

The novel apparatus contemplated by the invention may thus continuously advance a strip of dough, centrally fold successive sections thereof of predetermined length, and sever the sections in the fold and from the leading end of the strip to form scoop-shaped products 51 as illustrated in FIG. 6. The products are gripped in pairs by jaws 31, 32 until the same are released by the opening of the jaws between locations c and d, as seen in FIG. 1.

Although only a single embodiment of the invention has been illustrated in the drawings and described in the foregoing specification, it is to be expressly understood that the same is not limited thereto, but that various changes may be made in the specifics of such disclosure without departing from the spirit and scope of the invention, as the same will now be understood by artisans of ordinary skill in the art.

The embodiments of the invention in which an exclusive property or privilege is claimed are defined as follows:

1. Apparatus for producing food products from a ribbon like strip of edible material comprising continuously operable conveyor means for continuously longitudinally advancing said strip, said means having blocks for supporting said strip at longitudinally spaced intervals, and means for bending the advancing strip between successive supporting blocks along the longitudinal center line thereof to form spaced folds therein.

2. Apparatus as defined in claim 1 comprising means for holding the advancing strip against appreciable movement away from said supporting blocks while the same is being bent by said bending means.

3. Apparatus as defined in claim 1 comprising means for severing said advancing strip transversely on a line centrally of each said fold.

4. Apparatus as defined in claim 3 wherein said severing means is carried by said bending means.

5. Apparatus as defined in claim 3 comprising means for severing the advancing strip on lines extending transversely across said supporting blocks between successive folds.

6. Apparatus as defined in claim 1 wherein said bending means comprise clamping jaws carried by the conveyor means.

7. Apparatus as defined in claim 6 comprising cam means for opening and closing said jaws in response to movement of the conveyor means.

8. Apparatus as defined in claim 7 comprising rollers mounted on said jaws for cooperation with said cam means.

9. Apparatus for forming a food product or the like comprising conveyor means for continuously longitudinally advancing a flexible ribbon-like strip of material including sections severed from the leading end thereof, means movable in the same direction and at the same speed as said conveyor means for bending the advancing strip at spaced intervals approximately along the longitudinal center line thereof to form spaced folds and pressing the sides of the folds together, and means for transversely severing the advancing strip approximately midway between successive folds and approximately at the center of each fold, whereby scoop-like products are formed, each said product having a finger grip portion at one end and a transversely bowed portion at the other end.

10. Apparatus for producing shaped food products from a strip of gelatinized material comprising conveyor means for continuously longitudinally advancing said strip, means for bending the advancing strip at spaced intervals to form longitudinally spaced transverse folds therein, and means for severing said advancing strip transversely on lines centrally of each said fold and centrally between successive folds therein, whereby scoop-shaped products are formed, the folded ends of which constitute finger grips and transversely bowed ends of which constitute scoop portions.

11. Apparatus for producing food products from a pliable ribbon-like strip of edible material comprising conveyor means for continuously longitudinally advancing said strip including sections severed from the leading end thereof, said conveyor means having spaced block-like means for supporting said strip at longitudinally spaced intervals, means for severing a section from the leading end of the advancing strip on a transverse line across said supporting means, means operable between successive block-like supporting means for bending said advancing severed section to form a fold centrally thereof, means for holding said advancing severed section against appreciable movement away from said supporting means while the same is being bent by said bending means, and means for transversely severing said section centrally thereof.

References Cited
UNITED STATES PATENTS

| | | | |
|---|---|---|---|
| 3,335,678 | 8/1967 | Katz | 107—68 |
| 3,394,646 | 7/1968 | Cunningham | 107—69 X |
| 3,433,182 | 3/1969 | Thompson | 107—69 |
| 3,504,640 | 4/1970 | Eiden et al. | 107—69 |

FRANK L. ABBOTT, Primary Examiner

S. D. BURKE, Assistant Examiner